United States Patent [19]
Hirano

[11] Patent Number: 5,080,535
[45] Date of Patent: Jan. 14, 1992

[54] DRILL CHIPS REMOVING DEVICE

[75] Inventor: Yukio Hirano, 1518-5, Yokosuka, Hamakita-shi, Japan

[73] Assignee: Yukio Hirano, Hamakita, Japan

[21] Appl. No.: 549,391

[22] Filed: Jul. 6, 1990

[30] Foreign Application Priority Data

Jul. 13, 1989 [JP] Japan .................. 1-082681[U]

[51] Int. Cl.$^5$ .............................................. B23B 47/34
[52] U.S. Cl. ..................... 408/67; 29/DIG. 52; 407/5; 408/202; 408/240
[58] Field of Search .......... 408/67, 202, 68, 239, 408/239 A, 240; 29/DIG. 52; 409/137; 407/2, 3, 4, 5, 6

[56] References Cited

U.S. PATENT DOCUMENTS

| 74,466 | 2/1868 | Whiting | 408/202 |
| 3,301,101 | 1/1967 | McEwen | 408/67 |
| 4,076,443 | 2/1978 | Halpern | 408/202 X |
| 4,168,131 | 9/1979 | Hill | 408/202 X |
| 4,413,937 | 11/1983 | Gutsche | 408/239 A |

Primary Examiner—Z. R. Bilinsky
Attorney, Agent, or Firm—Oliff & Berridge

[57] ABSTRACT

A drill chips removing device, comprising a sleeve or a ring formed with a through hole at its central portion for axially passing said drill therethrough and provided with a fixing device for fixing the sleeve or the ring to the drill.

3 Claims, 2 Drawing Sheets

DRILL CHIPS REMOVING DEVICE

BACKGROUND OF THE INVENTION

The present invention relates to an auxiliary device for removing chips produced in a hole drilling process.

In a hole drilling process, chips cut out from a work by tip edges of a drill are moved upwards through twisted grooves of the drill, and then, discharged to the outside. When the work is made of a hard metal, the chips are discharged with spiral shapes, while when made of a soft material, the chips are discharged in a pushing out manner.

The function of the twisted grooves of a drill is not limited to providing passages for discharging such chips, but includes to introduce a lubricant oil into the hole from the outside and supply the lubricant oil to the tip edges of the drill for decreasing frictional resistance and cooling the edges on the purpose of maintaining a convenient drilling condition and assuring a long life of the drill.

As mentioned above, the chips are discharged to the outside through the twisted grooves of the drill. The chips continuously discharged with spiral shapes wind around the drill in continuous manner, thereby frequently disturbing a further drilling into the hole. In such a case, the drilling work must be interrupted for a while and the chips must be removed for restarting the drilling work.

Further, in case the chips are jammed in the twisted grooves, since the drill can not move forwards, the drilling work must be once interrupted, and after the chips have been removed from the twisted grooves, the drilling work can be again started.

SUMMARY OF THE INVENTION

The object of the present invention is to provide a drill chips removing device capable of preventing any work interruption caused by drill chips produced in a drilling process.

For achieving the above-mentioned object of the invention, a drill chips removing device according to the present invention includes a sleeve or a ring which is formed with an axial through hole for passing the drill therethrough and has a fixing means for fixing this sleeve to the drill. According to another aspect of the invention, the drill chips removing device additionally includes claws adapted to intrude into twisted grooves of a drill, or bolts with tips engaging with the twisted grooves.

When a drilling work is carried out with a drill gripped by a chuck of a boring machine and equipped with the drill chips removing device, the drill chips coming out with continuous spiral shapes abut against the lower end surface of the sleeve or the ring, and are forcibly removed radially outwardly, thereby preventing the drill chips from winding around the drill. Further, in case of a soft material apt to jam, the chips are forcibly removed from the twisted grooves by means of the claws or the bolts.

DESCRIPTION OF THE PREFERRED EMBODIMENT

Figure 1:
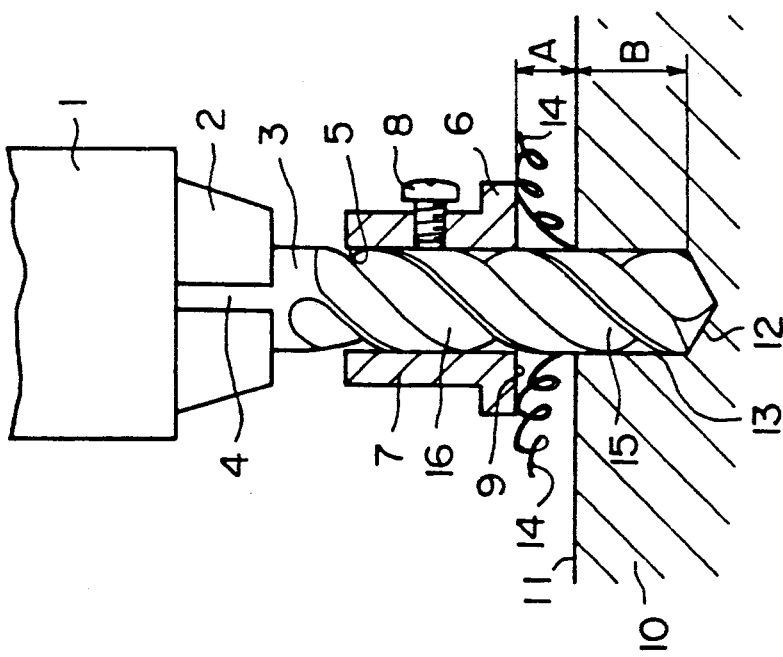
FIG. 1 is a sectional view of a drill chips removing device according to an embodiment of the present invention.

FIG. 1 shows an embodiment of the present invention. Numeral 1 denotes a chuck of a boring machine. The shank 4 of a drill 3 is gripped by three jaws 2 of the chuck 1. Around the drill 3 is provided a sleeve 7 having an axial through hole 5 for passing the drill 3 at its central portion and a flange at its lower end, and is fixed to the drill 3 by means of a setscrew 8. Number of the setscrew is not limited to one, but a plurality of setscrews may be provided at positions of the same number, for example, at four positions circumferentially arranged at angular intervals of about 90°. For surely fixing the setscrew to the drill, the drill may be formed with a recess for receiving the tip portion of the setscrew. The sleeve 7 is fixed to the drill 3 at a position where, when the tip 12 of the drill 3 is drilled into a boring hole 13 by a depth B, the distance A from the lower end surface 9 of the sleeve 7 to the surface 11 of the work 10 is a permissible minimum dimension.

When the drill 3 is lowered with the tip 12 drilling the hole 13 through the surface 11 of the work 10, the chips 14 are discharged from the hole 13 to the outside through two twisted grooves 15, 16 formed in the drill. Since the number of the twisted grooves is two and the tip edge portion has a symmetric shape, the drill chips 14 are continuously discharged radially outwardly with a symmetrical spiral shape when the drilling condition is suitable. Since the flow of the drill chips collides against the lower end surface 9 of the sleeve 7 and is further deflected radially outwardly, it can be prevented for the chips to wind around the drill 3. In addition, since the flow of the chips is forcibly deflected, the continuation of the chip flow is interrupted, thereby preventing the chips from being swinged with the chip having a long shape or from flying apart.

Figure 2:
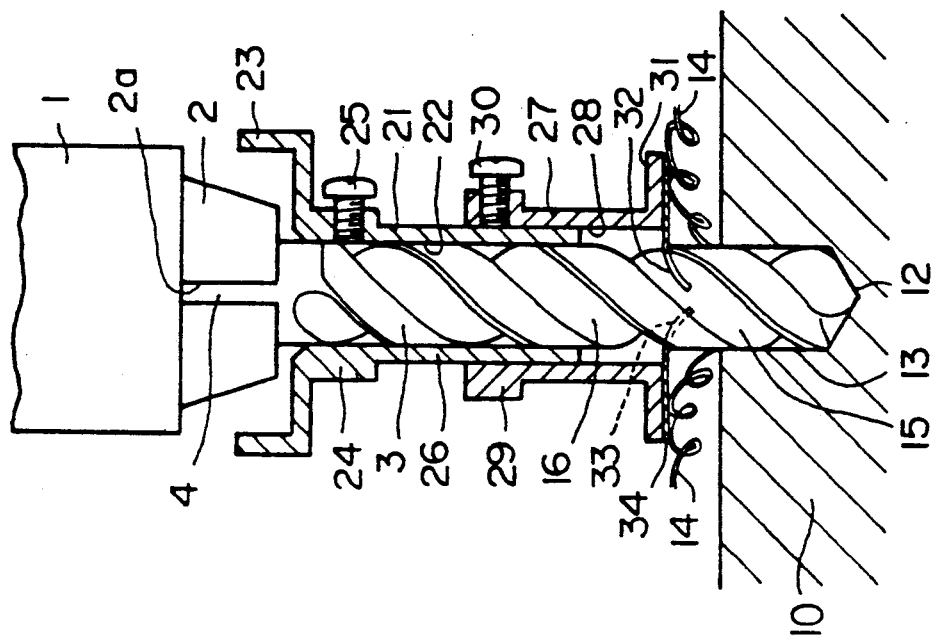
FIG. 2 is a sectional view of another embodiment of the present invention.

FIG. 2 shows another embodiment of the present invention. In this embodiment, the sleeve is doubled and its length is adjustable. The upper sleeve 21 is formed with an axial through hole 22 for passing the drill at its central portion, and with an oil receiver 23 of a saucer shape at its upper portion. The upper sleeve 21 is fixed to the drill 3 at its middle portion 24 by means of a setscrew 25, and the sliding portion 26 below the middle portion 24 has an outer diameter smaller than that of the middle portion 24. The lower sleeve 27 has an inner peripheral surface 28, which engages with the outer peripheral surface of the sliding portion 26 of the upper sleeve 21 in a sliding manner, and is fixed to the upper sleeve 21 at its upper portion 29 by means of a setscrew 30 and has a flange 31 at its lower surface. On the lower surface of the flange 31 is mounted a disc 34 which has two claws 32, 33 at its central portion. These claws 32, 33 of the disc 34 intrude into the twisted grooves 15, 16, respectively, and contact with the bottoms of the grooves with elastic forces.

In this embodiment, by adjusting the position of the lower sleeve 27 relative to the upper sleeve 21, the total length of the sleeve can be suitably determined according to the length of the drill 3 and/or the depth of the drill hole 13. Further, by pouring cutting oil into the oil receiver 23, the cutting oil can be effectively supplied to the tip edge portion 12 through the twisted grooves 15, 16. In addition, the drill chips 14 discharged from the hole 13 can be removed radially outwardly by means of the circular disc 34, and the chips jammed in the grooves 15, 16 can be removed by means of the claws 32, 33.

Figure 4:
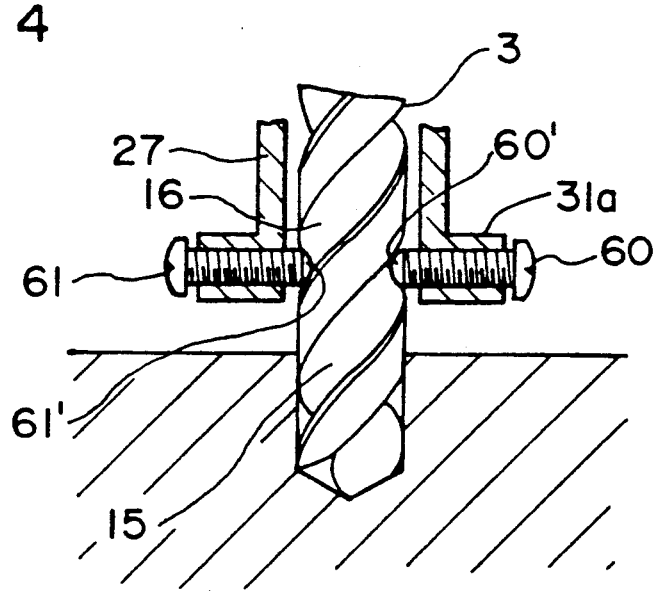
FIG. 4 is a partial fragmentary sectional view of a modification of the embodiment shown in FIG. 2.

As shown in FIG. 4, it is also possible to provide a thick flange 31a, to screw two bolts 60, 61 therethrough, and to engage the spherical or semi-cylindrical tip portions 60', 61' of the bolts 60, 61 with the twisted grooves 15, 16, respectively, for removing drill chips and preventing the drill chips from intruding into the inside of the lower sleeve 27 through along the twisted grooves.

Figure 3:
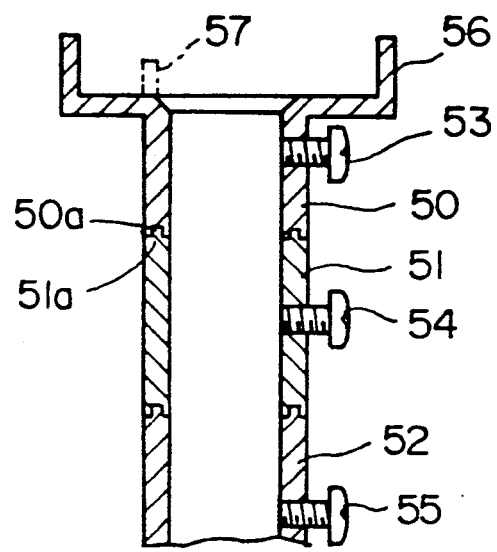
FIG. 3 is a partial fragmentary sectional view of further embodiment of the present invention.

FIG. 3 shows a further embodiment of the present invention. In this embodiment, below a sleeve 50, which has an oil receiver 56 similarly to the upper sleeve 21 in the embodiment of FIG. 2, are arranged and sequentially connected a plurality of sleeves 51, 52 with the connecting ends butting against each other, and these sleeves 50, 51, 52 are secured to the drill by means of screws 53, 54, 55, respectively. The lower end of the sleeve 50 and the upper end of the sleeve 51 are formed with an annular groove 50a and an annular projection 51a, respectively, and the sleeve 50 and the sleeve 51 are connected with each other with the annular grooves 50a and the annular projection 51a fitted to each other. Similarly, the sleeve 51 and the sleeve 52 are connected with each other with their similar ends fitted with each other.

When a plurality of sleeves are provided as shown in this embodiment and sequentially connected with each other in an end butting manner, the total length of the sleeve can be adjusted by suitably selecting the number of sleeves to be connected. For example, by omitting the sleeve 52, the total length of the sleeve is shortened.

In the embodiments shown in FIGS. 2 and 3, it is also possible to provide a projection 57 (refer to FIG. 3) on the bottom surface of the oil receiver 23, 56 and insert the projection 57 into the gap 2a defined between the jaws 2 (refer to FIG. 2), so that, when the chuck 1 together with the drill 3 is rotated, the chips removing device is integrally rotated together without suffering any slip, if the shape of the jaw 2 is suitably selected.

Although, in the above-mentioned embodiments, the drill chips removing device includes a sleeve or sleeves, it may be composed of a ring. Further, it is also possible to provide a drill passing hole structure having a rather greater inner diameter and to make the hole enlarged or shrunk by using setscrews of three to four pieces or using push nuts for making it possible to use only one drill chips removing device even when the diameter of the drill is varied. The fixing means for securing a drill chips removing device to a drill can have the other measures. In addition, the present invention can have its various modifications.

As mentioned above, since a drill chips removing device according to the present invention includes a sleeve or a ring having a through hole for passing the drill and a fixing means for fixing the device to the drill, the chips removing work in a drilling process is surely carried out and no interruption of drilling process is required differently from in prior arts, although the device is very simple in structure and very cheap in price. As a result, the work efficiency is significantly improved. Further, since no drill chip winds around the drill or is jammed in the drill, no adverse force is applied to the drill, thereby assuring a long life of the drill.

What is claimed is:

1. A drill chips removing device, comprising:
   a sleeve or a ring formed with a through hole for passing said drill and provided with a fixing means for fixing said sleeve or said ring to said drill,
   wherein said sleeve or ring is formed with a projection at the upper portion thereof, said projection being inserted into a gap defined between jaws of a chuck gripping said drill, for preventing said sleeve or ring from slipping relative to said chuck, and interconnecting said chuck, drill and sleeve.

2. A drill chips removing device as claimed in claim 1, further comprising claws intruding twisted grooves of said drill.

3. A drill chips removing device as claimed in claim 1, further comprising bolts having tip portions engaging with twisted grooves of said drill.

* * * * *